J. A. JOHNSTON.
NUT TAPPING MACHINE.
APPLICATION FILED MAY 20, 1913.
1,089,925.
Patented Mar. 10, 1914.
2 SHEETS—SHEET 1.
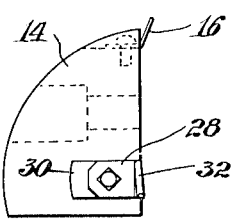
Fig. 3.
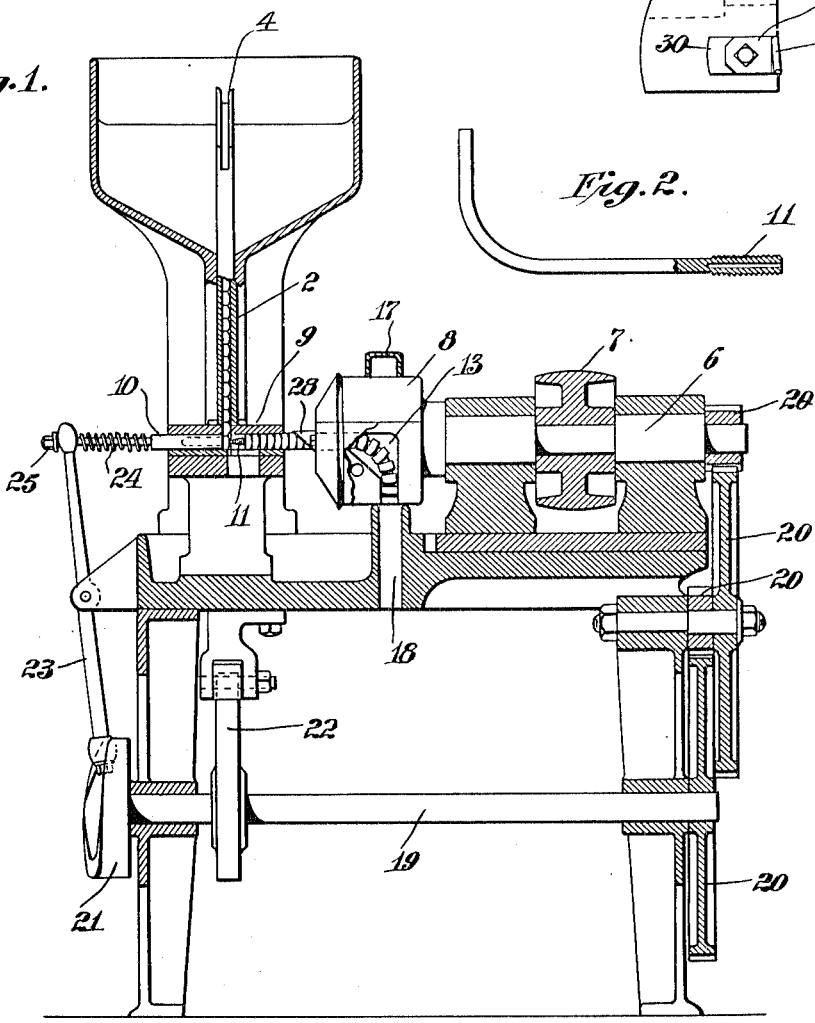
Fig. 1.
Fig. 2.
Attest:
Paul H. Franke
by
Inventor:
John Alexander Johnston
Attys

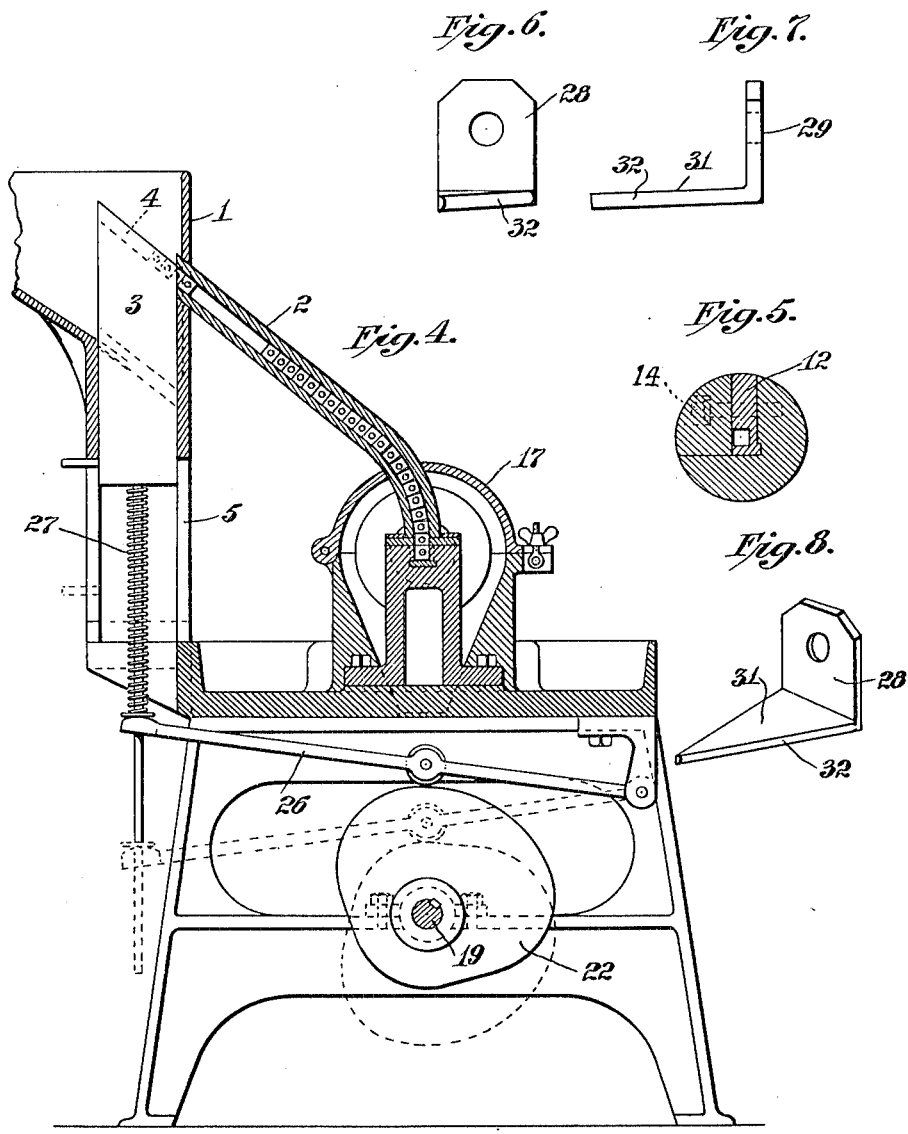

UNITED STATES PATENT OFFICE

JOHN ALEXANDER JOHNSTON, OF MONTREAL, QUEBEC, CANADA.

NUT-TAPPING MACHINE.

1,089,925.  Specification of Letters Patent.  Patented Mar. 10, 1914.

Application filed May 20, 1913. Serial No. 768,736.

*To all whom it may concern:*

Be it known that I, JOHN ALEXANDER JOHNSTON, a citizen of the Dominion of Canada, and a resident of Montreal, in the Province of Quebec, Dominion of Canada, have invented certain new and useful Improvements in Nut-Tapping Machines, of which the following is a specification.

This invention relates to automatic nut tapping machines and comprises improvements upon a machine for the same purpose illustrated and described in my application for Letters Patent filed December 20, 1910, Sr. No. 598,405.

My invention comprises automatic means for insuring correct entry of the tapped nuts into the nut passage of the chuck.

The object of my invention is to facilitate the operation of nut tapping machines, and, in particular, to insure the proper presentation of the tapped nuts for entry into the chuck.

In the accompanying drawings I illustrate my invention as applied to the nut tapping machine illustrated and described in my said prior application.

In said drawings: Figure 1 shows a longitudinal vertical section of the machine; Fig. 2 shows a detail elevation and partial section of the screw tap and nut-guide of the machine; Fig. 3 is an end view of the chuck cap, showing my improvement, termed a nut placer, in place thereon. Fig. 4 shows a transverse vertical section of the machine through the feed chute. Fig. 5 shows a transverse section of the chuck. Fig. 6 shows a detail front elevation of the nut placer, and Fig. 7 shows a side elevation of such nut placer. Fig. 8 shows a perspective elevation of the nut placer.

In order that the manner of operation of my nut placer, and the reason for the use thereof, may be clearly understood, I will first describe briefly the particular nut tapping machine in connection with which I have illustrated the said nut placer, and the method of operation of the machine. It should be understood, however, that my invention is by no means limited to use with the particular nut tapping machine illustrated and described, as other nut tapping machines operating in accordance with the same general principle are known.

The said nut tapping machine comprises a hopper 1 from which the nut blanks to be tapped are fed; a chute 2 into which the nut blanks are delivered from the hopper, and by which the nut blanks are conveyed to a so-called nut-holder hereinafter mentioned; and a vertically reciprocating nut feeder 3 having an oblique upper surface and provided in said surface with a groove 4 of a width adapted to hold the nuts edgewise. This nut feeder reciprocates up and down, through an opening in the bottom of the hopper, in guides 5.

The machine further comprises a driving shaft 6, mounted in suitable bearings and provided with a belt pulley 7, whereby said shaft may be driven. Upon this shaft is mounted a chuck 8. In axial line with the said chuck there is a nut holder 9, located at the end of the chute 2; and opposite this nut holder, and mounted to slide in an orifice in the frame of the machine, there is a plunger 10, reciprocated as hereinafter described, and adapted to force the nut blanks successively into the nut holder. Within the nut holder is a screw tap 11—this tap being extended at its rear end to form a guide for the threaded nuts, the said guide being bent as indicated particularly in Figs. 1 and 2.

The chuck 8 comprises a tap holder 12 (see particularly Fig. 5) having within it a bent nut-passage 13 (Fig. 1) of a form suitable to receive the curved shank or guide of the tap 11; the said nut passage terminating at the periphery of the chuck. This nut passage 13 is open at one side, so far as the tap holder is concerned, such open side being normally closed by a removable chuck cap 14 (shown in detail in Fig. 3) normally held in place by means of a screw 15, indicated in dotted lines in Fig. 5. A flat spring 16 mounted upon the said chuck cap engages the nuts as they reach the peripheral orifice of the nut passage 13, holding the nuts successively against discharge, until they are positively pushed out by the nuts behind them. The portion of the chuck in which this peripheral discharge opening is located is surrounded by a channeled casing 17 forming a part of the frame of the machine, and leading to a discharge opening 18.

The nut feeder 3 and the plunger 10 are operated by cams on a cam shaft 19 driven from the shaft 6 by means of gears 20. For operating the plunger 10 a face cam 21 is provided, the follower 23 for this cam working against a spring 24 mounted upon the plunger 10; said follower also engaging, upon its rear side, a nut 25 carried by that plunger; whereby, as said lever or follower 23 is vibrated by cam 21, the plunger 10 is first withdrawn from beneath the feed chute 2 to permit a nut blank to drop from said chute in front of the nut holder 9, and then said plunger 10 is thrust forward by pressure applied to said plunger, through the spring 24, by the follower 23, the plunger then forcing the nut blank, which has just dropped in front of the nut holder, into said nut holder and against the end of the tap 11. This tap is revolving, since the chuck 8 is revolving, and therefore when the nut blank is so brought into engagement with the tap, said tap threads the nut blank, at the same time feeding it backward, causing the nut so threaded to force on into the nut passage of the chuck previously threaded nuts strung upon the tap and its bent shank. The nut blank having been well started upon the tap, the follower lever 23 retreats, drawing with it the plunger 10, to permit a new nut blank to drop in front of the nut holder.

For operating the nut feeder 3 a cam 22 is provided, this cam operating a follower lever 26 adapted to communicate motion through a spring 27 to the nut feeder 3. As this nut feeder 3 rises through the mass of nut blanks within the hopper 1, several of the said blanks will be caught in the groove 4 in the top of the feeder, and when said groove is opposite the mouth of chute 2 (where it remains for a short time due to a dwell, provided on the corresponding portion of the cam 22) the blanks so held in said groove will slide into the chute 2 and will fall down said chute to the end thereof, where they are held by the plunger 10 until said plunger 10 retreats as previously described, permitting one of the nut blanks so held to drop down in front of the nut holder 9.

It will be seen that in the operation of this machine nut blanks are fed successively into the nut holder and over the end of the tap 11, and that said tap 11, after engaging each nut blank, threads the same, at the same time moving such nut blank and other preceding threaded nuts, back into the nut passage of the chuck holder and thence out through the peripheral passage of such nut holder into the grooved channel 17, whence the threaded nuts fall into the passage 18.

The entrance and exit portions of the nut passage 13 conform in cross-sectional contour to the shape of the nuts tapped. In the drawings the nuts tapped are square, and hence the entrance and exit portions of the nut passage are square in cross section as indicated particularly in Fig. 5. It will be clear that the nuts on the straight portion of the shank of the tap 11 will not always be presented squarely to the entrance portion of the nut passage 13 unless said nut be guided into the passage 13 by hand, (and of course hand guiding is not desirable) or unless automatic means be provided for presenting the nuts properly to the entrance of the nut passage. For such automatic presentation of the nuts to the nut passage I have provided the so-called nut placer 28 shown in Fig. 3, and shown in detail in Figs. 6 and 7. This nut placer in practice comprises an angle-piece of hardened steel, having a base portion 29 mounted on the front face of the chuck cap 14 and held against rotation with respect to said chuck since this base portion is mounted in a groove 30 of the chuck cap; and said nut placer further comprises a forwardly projecting portion 31 which, customarily, is not exactly at right angles to the base portion 29, but is at a slightly obtuse angle with respect to said base portion, i. e., inclines slightly toward the axis of rotation of the chuck; and the said forwardly projecting portion 31 of the nut placer is furthermore of triangular form, having an oblique rounded edge 32 which is hardened and polished. It will be clear that, as the tapped nuts emerge from the nut holder 9 and are pressed backward along the shank of the tap, they will be engaged by the nut placer 28 and will be rotated by that nut placer upon the tap (owing to engagement of the oblique or wedge edge 32 of that nut placer with the side surfaces of the nuts) until such nuts are in exact registry with the entrance of the nut passage 13; said nut placer, therefore, insuring accurate presentation of the several nuts to the nut passage, and thereby permitting such nut passage to be made only very little larger than the nuts themselves. This is important, because the tap 11 is held in the chuck, by means of the nuts mounted on the shank of that tap and which are passing through the nut passage of the chuck. By insuring proper presentation of the nuts to the nut passage, and so permitting the nut passage to be made with only slight clearance at its entrance and exit, the tap is caused to be held firmly, lateral motion of the tap being reduced to a minimum.

What I claim is:—

1. In a nut tapping machine, the combination with a nut holder and a chuck, one of which members rotates with respect to the other, said chuck having in it a curved nut passage, and a tap having a bent shank, such shank located within such nut passage, the tap arranged to be held in the chuck by engagement of nuts moving along such shank with the said nut passage of the chuck, of nut placing means arranged to engage the nuts about to enter such nut passage and to regulate the presentation of such nuts to such nut passage.

2. In a nut tapping machine, the combination with a nut holder and a chuck, one of which members rotates with respect to the other, said chuck having in it a curved nut passage, and a tap having a bent shank, such shank located within such nut passage, the tap arranged to be held in the chuck by engagement of nuts moving along such shank with the said nut passage of the chuck, of nut placing means arranged to engage the nuts about to enter such nut passage, such nut placing means having a surface oblique to the line of travel of the nuts along the top-shank, which oblique surface is adapted to rotate the nuts by wedge action into position for entry of the nuts into such nut passage.

3. In a nut tapping machine, the combination with a nut holder and a chuck, one of which members rotates with respect to the other, said chuck having in it a curved nut passage, and a tap having a bent shank, such shank located within such nut passage, the tap arranged to be held in the chuck by engagement of nuts moving along such shank with the said nut passage of the chuck, of nut placing means arranged to engage the nuts about to enter such nut passage and comprising a projection from the end face of the chuck having an edge which is oblique to the direction of travel of the nuts along the tap-shank, such oblique edge adapted to engage the sides of nuts not already properly presented, and by wedge action to rotate such nuts into position for entry into such nut passage.

4. In a nut tapping machine, the combination with a nut holder and a chuck, one of which members rotates with respect to the other, said chuck having in it a curved nut passage, and a tap having a bent shank, such shank located within such nut passage, the tap arranged to be held in the chuck by engagement of nuts moving along such shank with the said nut passage of the chuck, of nut placing means arranged to engage the nuts about to enter such nut passage, comprising an angle-piece secured to the face of the chuck and having a forwardly projecting portion comprising an oblique edge adapted to engage properly presented nuts and to rotate same into proper position for entry into the nut passage.

5. In a nut tapping machine, the combination with a nut holder and a chuck, one of which members rotates with respect to the other, said chuck having in it a curved nut passage, and a tap having a bent shank, such shank located within such nut passage, the tap arranged to be held in the chuck by engagement of nuts moving along such shank with the said nut passage of the chuck, of nut placing means arranged to engage the nuts about to enter such passage comprising an angle-piece secured to the face of the chuck and having a forwardly projecting portion comprising an oblique edge, said forwardly projecting portion inclined toward the axis of the tap, said oblique edge adapted to engage improperly presented nuts and to rotate same into proper position for entry into the nut passage.

6. In a nut tapping machine the combination with a tap holding chuck having a nut passage therethrough, of nut placing means mounted upon such chuck and adapted to turn nuts presented to such passage into position to enter the same.

7. In a nut tapping machine the combination with a tap holding chuck having a nut passage therethrough, of nut placing means mounted upon such chuck and having a projecting portion provided with an oblique edge adapted to turn nuts presented to such passage into position to enter the same.

8. Nut placing means such as described, comprising an angle-piece adapted to be secured to a tap holding chuck, one side of the angle-piece forming a base, the other side of such angle-piece having an oblique edge.

9. Nut placing means such as described, comprising an angle-piece adapted to be secured to a tap holding chuck, one side of the angle-piece forming a base, the other side of such angle-piece having an oblique edge, the angle between the two sides of such angle piece being obtuse.

In testimony whereof I have signed this specification in the presence of two subscribing witnesses.

JOHN ALEXANDER JOHNSTON.

Witnesses:
M. Cox.
M. Laws.